Sept. 27, 1938.   P. E. FENTON   2,131,347
FASTENER ASSEMBLY
Filed Nov. 24, 1937
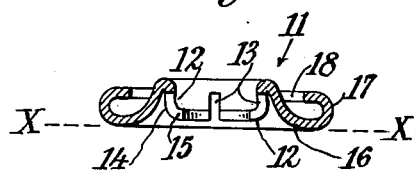
Fig.1.
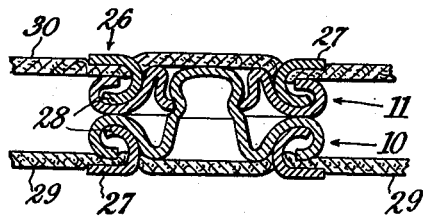
Fig.4.
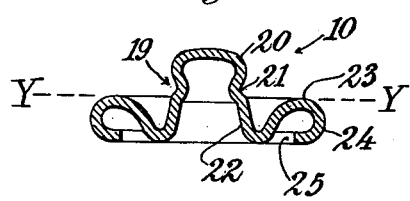
Fig.2.
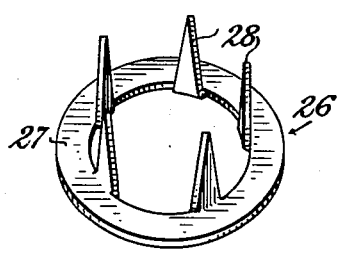
Fig.3.
Fig.7.
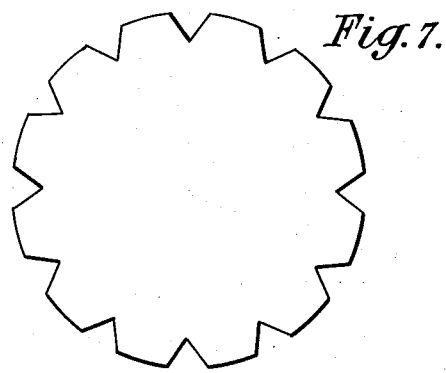
Fig.5.
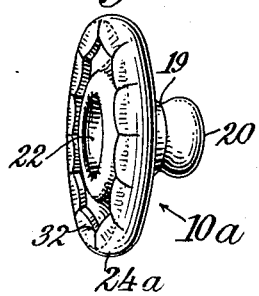
Fig.6.
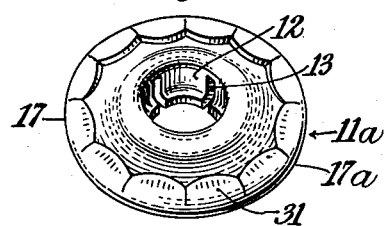
Fig.8.
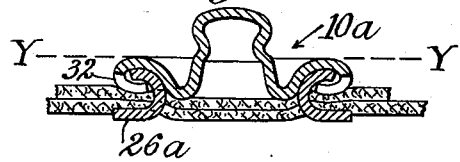
INVENTOR
Paul E. Fenton,
BY
Fraser, Myers & Manley
ATTORNEYS.

Patented Sept. 27, 1938

2,131,347

UNITED STATES PATENT OFFICE 2,131,347

FASTENER ASSEMBLY

Paul E. Fenton, Thomaston, Conn., assignor to Scovill Manufacturing Company, Waterbury, Conn., a corporation of Connecticut Application November 24, 1937, Serial No. 176,189

6 Claims. (Cl. 24—217)

This invention relates to improvements in separable fastener assemblies comprising stud and socket members suitably affixed to their supporting sheets and having complemental resilient parts which may be temporarily engaged or disengaged in the usual manner; and in its more particular aspects to improvements in the construction and manner of making the members of the assembly.

It is a general object of the invention to provide an assembly of this type in which the somewhat delicate, cooperating, resilient parts of the members are completely surrounded and protected by a cylindrical wall; and more specifically, to provide both the socket and the stud members with marginal portions which are adapted to cooperate, when the members are mutually engaged, to form a very stiff cylindrical wall completely surrounding and protecting the centrally located resilient parts.

The invention further aims to provide an assembly in which the constituent members have substantially identical marginal parts whereby certain manufacturing operations may be performed on common machines, or types of machines, and whereby a single type of attaching cap may be used for affixing them to their respective supporting sheets.

It is a further object of the invention to provide a fastener member with a resilient marginal retaining ring which may be compressed, and its axial dimension reduced, during the course of an operation wherein the member is affixed to a supporting sheet, so as to accommodate the member to the thickness of that sheet.

It is yet another object of the invention to provide a member with a marginal retaining ring having a free edge comprising a series of resilient fingers which may be bent inwardly, during the attaching operation, to accommodate supporting sheets of varying thicknesses; and to construct this member from an initially flat blank having a serrated, or scalloped, periphery which may be curled inwardly to form this retaining ring.

The full nature of the invention, along with other objects and various features thereof, will be more fully understood from a consideration of the following description in the light of the accompanying drawing, in which:—

Figures 1 and 2 are sectional views of the stud and socket members which are parts of the assembly;

Fig. 3 is a perspective view of a pronged attaching cap adapted to be used in affixing the members of Figs. 1 and 2 to their respective supporting sheets;

Fig. 4 is a sectional view of the members of Figs. 1 and 2 affixed to their respective supporting sheets and mutually engaged to form the assembly of the present invention;

Figs. 5 and 6 are perspective views of socket and stud members having the essential features of the members of Figs. 1 and 2, and, in addition, retaining rings with resilient free edges constructed in accordance with the principles of the present invention;

Fig. 7 is a plan view of a sheet metal blank from which a member of the type shown in Figs. 5 or 6 may be made; and Fig. 8 is a sectional view illustrating the attachment of the member of Fig. 6 to a supporting sheet.

The assembly of the present invention is illustrated in Fig. 4. There it may be seen to comprise a stud member 10 having a central post with a contracted neck portion; and a cooperating socket member 11 having a plurality of resilient fingers engaging the neck of the stud so as to hold the sheets to which the members are attached in a desired relation; and further, the stud member has a marginal breast portion which is adapted to contact a similar breast of the socket to form a very strong cylindrical wall completely surrounding the more delicate cooperating parts and protecting them from damaging stresses.

The socket member of the assembly (Fig. 1) preferably comprises a central cylindrical wall 12, axially slitted at 13 to form a plurality of resilient fingers 14, and inturned along its lower edge to provide each of these fingers with a stud-engaging bead 15; a curved breast portion 16 flaring arcuately downwardly and outwardly from the upper end of the cylindrical wall; and a generally U-shaped retaining ring 17 extending upwardly and inwardly from the outer edge of the breast with its free inner edge disposed in spaced relation to an outwardly sloping part of the rear surface of that breast so as to define a relatively wide annular entrance slot 18 through which the prongs of an attaching cap may be passed, as will later be brought out. It will be noted, in connection with this preferred form of socket member, that the breast portion thereof extends downwardly for such distance that its lowermost or front surface lies in a horizontal plane X—X which is located below the end of the cylindrical wall 12; and outwardly to such an extent that the width of this member is considerably greater than the radius, and almost equal to the diameter, of the central cylindrical wall. Accordingly, it will be seen that the somewhat delicate stud-engaging fingers 14 lie well within and behind the planes defining the front surface of this breast, and will, in use, be protected by that latter element. For a more detailed and complete description of this member, reference may be had to Patent No. 2,106,728.

The preferred form of stud member is illustrated in Fig. 2, and comprises a central post 19 with an imperforate head 20, a contracted neck 21, and a depending outwardly flaring skirt 22; an imperforate breast portion 23 extending upwardly and outwardly from the lower end of the skirt; and a U-shaped retaining ring 24 extending downwardly and inwardly from the outer margin of the breast and terminating in spaced relation to the under surface of that element so as to define a relatively wide annular entrance slot 25 to the retaining ring. In constructing this member the breast is flared outwardly to such an extent that the uppermost points (as viewed in Fig. 2) of its front face lie in a plane Y—Y which is located below the plane of the contracted neck 21 of the post, and outwardly for such distance as is necessary to make the radial dimension of this breast equal to that of the breast of the socket. Specifically, and it may readily be understood by reference to Fig. 4, the plane Y—Y lies as far below the neck of the stud post as the plane X—X lies below the ends of the resilient fingers of the socket member.

The attachment of the members to their respective supporting sheets may be had by means of a pronged attaching cap 26 such as the one shown in Fig. 3, comprising a radial flange 27 having a plurality of arcuately spaced prongs 28 extending axially therefrom. The attachment is accomplished by positioning the member, the stud 10, for example, on one side of its supporting sheet 29 with its entrance slot 25 facing the sheet, and then driving the pointed prongs 28 through the sheet, through the entrance slot, and against an outwardly sloping part of the underside of the breast so as to turn them outwardly into the retaining ring 24, and thus clamp the sheet between the flange 27 and the under side of the retaining ring. The socket 11 may be affixed to its supporting sheet 30 in exactly the same way.

The advantages of the present assembly may best be understood by reference to Fig. 4. There it may be seen that when the socket member and the stud are mutually engaged, with the resilient fingers of the former frictionally engaging the contracted neck of the latter in the usual manner, the planes X—X and Y—Y of Figs. 1 and 2 coincide so that the outermost surfaces of the breasts 16 and 23 are brought into contacting relation. These breasts then, in conjunction with the retaining rings 17 and 24, and the attaching caps 26, form a strong cylindrical wall, comprising eight thicknesses of metal, completely surrounding the more delicate centrally located fingers and stud. Further than that, it will be seen that the flanges 27 of the attaching caps which form the ends of this wall, in each case overhang the adjacent end parts of the fingers and stud. The delicate parts then are not only surrounded by the cylindrical wall, but are completely enclosed therewithin. Accordingly, if this assembly, attached to an article of clothing, for example, is passed through the mangle of a washing machine as not infrequently happens, the superposed layers of metal comprising the wall will absorb the entire stress imposed and completely protect the more delicate parts.

Another functional advantage of the assembly flows from the fact that the line of contact between the breasts is spaced well out from the line of contact between the fingers and stud, and hence it tends to stabilize the assembly and prevent one member from tilting-off of the other.

The socket and stud members are both preferably of one-piece construction, and are made by drawing, pressing and rolling appropriate sheet metal blanks to form the central cooperating parts, and the breasts, and then spinning or curling the edges of the blank rearwardly and inwardly to complete the retaining rings.

The members illustrated in Figs. 1 and 2 were constructed from initially flat circular blanks. In completing the retaining rings thereof some considerable trouble was encountered due to the tendency of the continuous edges of the blanks to split and wave during the curling operation. Further, when completed, the rings were found to be unduly stiff. That stiffness, while desirable in some respects, is objectionable in others. Specifically, it interferes with the attachment of the member to certain classes of supporting sheets. If, for example, it is applied to a fairly thick sheet, or, as frequently happens, to a doubled over part, the stiff ring refuses to give in the course of the operation, and the material intervening between the ring and the flange of the attaching cap is accordingly subjected to excessive pressures. One of two things is liable to happen. The cap will cut through the sheet, or the pressure on the material may spring the one element away from the other. Either is disastrous.

The foregoing difficulties may be avoided by making the members from a blank, such as the one shown in Fig. 7, having initially scalloped or serrated edges. In that blank, enough material is removed from the edge to avoid waving; and as will readily be evident, this edge can be curled without difficulty. When completed, the free edge of the ring comprises a series of resilient fingers, 31 in the socket of Fig. 5, and 32 in the stud of Fig. 6. When a member of this type, a stud 10a, for example, is applied to a thick supporting sheet, the fingers bend upwardly to accommodate any excess material as shown in Fig. 8. It is of importance to note that only the fingers give in this manner. The front surface of the breast retains its position in the plane Y—Y so as to be capable of engaging the like surface of the breast of the stud in the manner and for the purposes shown and described in connection with Fig. 4.

The marginal parts of the constituent members of this assembly, that is the breast and the retaining rings, are substantially identical. Accordingly, the curling of the edges of the blanks for either a stud or a socket can be performed on a single machine, or type of machine, and this is true regardless of whether it is made from a circular or scalloped blank. The avoidance of the necessity for different machines to make the rings for sockets and studs, of course, results in a saving in manufacturing costs. Further, as will be evident from Figs. 4 and 8, a single type of attaching cap may be used for affixing either member to its supporting sheet. This assembly, then, requires the manufacture and stocking, of a lesser number of different parts than is usual; and savings both in manufacturing and inventory costs can be effected.

Since certain changes may be made in the construction and arrangement without in any way departing from the teaching of the invention, it is intended that the foregoing shall be construed in a descriptive rather than a limiting sense.

What I claim is:

1. A resilient fastener assembly comprising socket and stud members having centrally located resilient parts cooperating to hold the members together, breast portions extending radially outwardly from the central parts of the members and axially forwardly so as to contact along their outer faces, and retaining rings extending reversely inwardly from the outer edges of the breasts, said breast and retaining rings forming, collectively, a cylindrical wall completely surounding and protecting the centrally located cooperating parts.

2. A resilient fastener assembly comprising a socket member having centrally located resilient stud engaging parts, a breast portion surrounding said parts with its outermost surface lying in front of the parts, and an annular retaining ring extending rearwardly and inwardly from the outer margins of the breast; and a stud member having a central post with a contracted neck engaged by the resilient parts of the socket, a breast portion surrounding said post with its outermost surface lying behind the contracted neck and engaging the outermost surface of the breast of the socket, and an annular retaining ring extending rearwardly and inwardly from the margins of this breast, said breasts and retaining rings forming a cylindrical wall completely surrounding and protecting said stud post and the resilient parts of the socket which engage it.

3. A resilient fastener assembly comprising a socket member having a plurality of centrally disposed resilient stud-engaging fingers, a breast portion extending outwardly and downwardly from the upper ends of such fingers with its outermost surface lying below the lowermost ends thereof, and a retaining ring extending upwardly and inwardly from the outer edge of the breast; and a stud member having a centrally disposed post with a contracted neck engaged by the lower ends of the fingers of the socket, a breast portion extending upwardly and outwardly from the lower end of the post with its outermost surface engaging a like part of the breast of the socket, and a retaining ring extending downwardly and inwardly from the edge of the breast, said breast and retaining rings serving collectively as a cylindrical wall completely surrounding and protecting the more delicate fingers of the socket and neck of the post.

4. A resilient fastener assembly comprising, in combination, a socket member having a plurality of centrally disposed resilient stud engaging fingers, an inperforate breast portion extending radially outwardly and downwardly from the rear ends of the fingers with its lowermost surface lying below the lowermost ends of the fingers, and a U-shaped retaining ring extending upwardly and inwardly from the outer margin of the breast with its inner edge disposed in spaced relation to the upper surface of the breast so as to define an entrance slot; a sheet of supporting material disposed over the socket member; and an attaching cap having a radial flange engaging said sheet and a plurality of arcuately spaced prongs extending therethrough with their free ends lying in and held by the retaining ring; and, a stud member having a centrally located upstanding post with a contracted neck engaged by the fingers of the socket member, an imperforate breast extending radially outwardly and upwardly from the lower end of the post with its uppermost surface lying below the contracted neck of the post and engaging the lowermost surface of the breast of the socket member, and a U-shaped retaining ring extending downwardly and inwardly from the outer edge of the breast with its inner edge spaced from the under surface of the breast; a sheet of supporting material disposed over the stud member and facing the entrance slot; and an attaching cap having a radial flange engaging said sheet, and a plurality of prongs passing therethrough with their free ends confined within the retaining ring; said breasts, said ring and said attaching caps forming, collectively, a strong cylindrical wall completely enclosing the fingers of the socket and the neck of the post.

5. A resilient fastener assembly comprising, in combination, a one-piece sheet metal socket member having a plurality of centrally disposed resilient stud-engaging fingers; an imperforate breast portion extending radially outwardly and downwardly from the upper ends of the fingers with its lowermost surface lying below the lowermost free ends of the fingers, and a U-shaped retaining ring extending upwardly and inwardly from the outer edge of the breast and terminating with its inner edge disposed in spaced relation to the upper side of the breast and with its uppermost surface spaced just below the upper ends of the stud engaging fingers; a sheet of supporting material disposed over the socket member; and an attaching cap having a radial flange engaging said sheet at a point above and outside of the upper ends of the resilient fingers, and a plurality of prongs extending through the sheet with their free ends lying in and held by the retaining ring; and a stud member having a centrally located upstanding post with a contracted neck engaged by the lower free ends of the resilient fingers of the socket; an imperforate breast extending outwardly and upwardly from the lower end of the post with its uppermost surface lying below the contracted neck of the post and engaging the under surface of the breast of the socket, and a U-shaped retaining ring extending downwardly and inwardly from the outer edge of the breast and terminating in spaced relation with the underside of that part; a sheet of supporting material underlying the stud; and an attaching cap having a radial flange engaging said sheet, and a plurality of prongs passing through the sheet with their free ends confined within the retaining ring of the stud; said breasts, said retaining rings, and said attaching caps forming, collectively, a strong cylindrical wall completely enclosing the centrally located fingers of the socket and head of the stud post.

6. A resilient fastener assembly comprising a socket member having a central, circular series of substantially axially disposed, resilient fingers each provided with an internal stud-engaging bead in its free, front end, a breast portion surrounding said fingers with its front surface lying forwardly of the free ends of the fingers, and an annular retaining ring extending rearwardly and inwardly from the outer margins of the breast; and a stud member having a central post with a contracted neck engaged by the free ends of the resilient fingers of the socket, a breast portion surrounding said post with its front surface lying behind the contracted neck of the post and engaging the front surface of the breast of the socket, and an annular retaining ring extending rearwardly and inwardly from the margins of this breast; said breasts and retaining rings forming a cylindrical wall completely surrounding and protecting said stud post and the resilient fingers of the socket which engage it.

PAUL E. FENTON.